US010552802B2

(12) United States Patent
Avery et al.

(10) Patent No.: US 10,552,802 B2
(45) Date of Patent: Feb. 4, 2020

(54) CENTRAL SERVER FOR MANAGING MAINTENANCE AND MATERIALS FOR COMMERCIAL AIRCRAFT FLEETS WITH FLEET-WIDE BENCHMARKING DATA

(71) Applicant: The Boeing Company, Chicago, IL (US)

(72) Inventors: Robert L. Avery, Escondido, CA (US); Wendy Cronie, Issaquah, WA (US); Erik Fromm, Bellevue, WA (US); Patricia Rhodes, Lake Stevens, WA (US); Cheryl Khera, Bellevue, WA (US); Paula M. Kirkish, Renton, WA (US); David R. Leonhardi, Shoreline, WA (US); Jay P. Maloney, Federal Way, WA (US)

(73) Assignee: THE BOEING COMPANY, Chicago, IL (US)

( * ) Notice: Subject to any disclaimer, the term of this patent is extended or adjusted under 35 U.S.C. 154(b) by 631 days.

(21) Appl. No.: 14/919,652

(22) Filed: Oct. 21, 2015

(65) Prior Publication Data

US 2016/0042325 A1 Feb. 11, 2016

Related U.S. Application Data

(63) Continuation of application No. 11/281,220, filed on Nov. 16, 2005, now abandoned.

(51) Int. Cl.
*G06Q 10/00* (2012.01)
*G07C 5/00* (2006.01)
(Continued)

(52) U.S. Cl.
CPC .......... *G06Q 10/20* (2013.01); *G06F 16/955* (2019.01); *G07C 5/008* (2013.01); *G07C 5/085* (2013.01)

(58) Field of Classification Search
CPC ...................................... G06Q 10/20
See application file for complete search history.

(56) References Cited

U.S. PATENT DOCUMENTS 6,567,729 B2   5/2003   Betters et al.
6,732,027 B2   5/2004   Betters et al.
(Continued)

OTHER PUBLICATIONS

Performance Based Contracting: How to Guide No. 17, May 1997, 37 total pages, author unknown.
(Continued)

*Primary Examiner* — Dennis W Ruhl
(74) *Attorney, Agent, or Firm* — MH2 Technology Law Group LLP

(57) ABSTRACT

Turnkey maintenance of a customer's aircraft fleet is managed by a single management service provider (MSP) controlling integrated maintenance and materials services from a central operations site. The MSP converts data received directly from on-board aircraft systems into information it uses to manage maintenance service providers and parts suppliers. The MSP contracts with and manages maintenance, repair and overhaul organizations (MROs) who perform the maintenance on the customers' aircraft at line and base stations. The MSP either remotely manages part inventories at the customer's site, or manages suppliers who deliver the parts to the MROs. Maintenance planning, scheduling and execution information is exchanged between the MSP, MROs, part suppliers and the customers through a shared data communication network controlled by the MSP. The MSP charges the customer for the maintenance services based on a flat rate per unit of aircraft flying time.

20 Claims, 12 Drawing Sheets

(51) Int. Cl.
G06F 16/955 (2019.01)
G07C 5/08 (2006.01)

(56) References Cited

U.S. PATENT DOCUMENTS

| | | | |
|---|---|---|---|
| 6,813,526 | B1 | 11/2004 | Dodd, Jr. |
| 7,064,668 | B2 | 6/2006 | Porad |
| 7,065,433 | B2 | 6/2006 | Basu |
| 7,260,389 | B2 | 8/2007 | Allen |
| 7,450,004 | B2 | 11/2008 | Allen |
| 7,551,086 | B2 | 6/2009 | Coop |
| 7,788,002 | B2 | 8/2010 | Yukawa |
| 8,056,800 | B2 | 11/2011 | Matsen |
| 8,316,225 | B2 | 11/2012 | Yukawa |
| 2003/0003872 | A1 | 1/2003 | Brinkley et al. |
| 2003/0109973 | A1 | 6/2003 | Hensey |
| 2005/0026609 | A1 | 2/2005 | Brinkley et al. |
| 2005/0065842 | A1 | 3/2005 | Summers |
| 2005/0131729 | A1 | 6/2005 | Melby et al. |

OTHER PUBLICATIONS

Mecray, "The Evolving Aircraft Engine Landscape—How GE Aircraft Engines is Raising the Competitive Bar", BTAlex. Brown.
Consumer Affairs.com, Airlines Outsourcing More Maintenance, http://www.consumeraffairs.com/news04/2005/airline_maintenance.html, Jan. 22, 2005.
Ghobrial, Atef, Outsourcing in the Airline Industry: Policy Implications, Journal of Transportation Law, Logistics & Policy, 4th Quarter 2005, vol. 72, Iss. 4, p. 457.
Jackman, Frank, Fewer Parts+More Aircraft=Greater Supply Chain Efficiency, Overhaul & Maintenance, vol. 11, Iss. 9, p. 40, http://proquest.umi.com/pqdweb?did=911250751&sid=12&Fmt=2&clientId=19649&RQT=309&VName=PQD, Oct. 1, 2005.
Careless, James, Airbus's New Support Strategy Values Customer Service, http://www.aviationtoday.com/am/categories/maintenance/170.html, Apr. 1, 2004.
The Boeing Company, PCT/US06/44749, International Search Report and Written Opinion, dated Sep. 14, 2007.
GE—Aviation Accessories.htm Y:\Public Domain Prior Art\GENERAL ELECTRIC\GE—Aviation Accessories.htm.
GE—Aviation Engine exchange.html Y:\Public Domain Prior Art\GENERAL ELECTRIC\GE—Aviation Engine Exchange.htm.
GE—Aviation on Wing Support.htm Y:\Public Domain Prior Art\GENERAL ELECTRIC\GE—Aviation on Wing Support.htm.
GE—Aviation OnPoint.htm Y:\Public Domain Prior Art\GENERAL ELECTRIC\GE—Aviation OnPoint.htm.
GE—Aviation Overhaul.htm Y:\Public Domain Prior Art\GENERAL ELECTRIC\GE—Aviation Overhaul.htm.
P&W—Services—Commercial—Customer Support.htm Y:\Public Domain Prior Art\PRATT&WHITNEY\Pratt & Whitney—Services—Commercial—Customer Support.htm.
P&W—Services—Commercial—Engine Maintenance.htm Y:\Public Domain Prior Art\PRATT&WHITNEY\Pratt & Whitney—Services—Commercial—Engine Maintenance.htm.
Pratt & Whitney—Services—Military—Engine Maintenance—Maintenance Services.htm Y:\Public Domain Prior Art\PRATT &WHITNEY\Pratt & Whitney—Services—Military—Engine Maintenance—Maintenance Services.htm.
P&W—Services—Commercial—Engine Maintenance—Engine Overhaul and Repair Services.htm Y:\Public Domain Prior Art\PRATT &WHITNEY\Pratt & Whitney—Services—Commercial—Engine Maintenance—Engine Overhaul and Repair Services.htm.
P&W—Services—Commercial—Engine Maintenance—Fleet Management Programs.htm Y:\Public Domain Prior Art\PRATT &WHITNEY\Pratt & Whitney—Services—Commercial—Engine Maintenance—Fleet Management Programs.htm.
Pratt & Whitney—Services—Military—Engine Maintenance—Engine Overhaul.htm Y:\Public Domain Prior Art\PRATT &WHITNEY\Pratt & Whitney—Services—Military —Engine Maintenance—Engine Overhaul.htm.
P&W—Services—Military—Engine Maintenance.htm Y:\Public Domain Prior Art\PRATT&WHITNEY\Pratt & Whitney—Services—Military—Engine Maintenance.htm.
Mrms.pdf document, www.rolls-royce.com.
Rolls-Royce Services.htm Y:\Public Domain Prior Art\ROLLS ROYCE\Rolls-Royce Services.htm TotalCare® is the premier aftercare service provision for Airline Fleet operators.
Aircraft & Commerce magazine, Maintenance Engineering section, various issues, NIMROD Publishing. Distribution of the magazine is limited, but available through the library. The magazine provided data that was used to test Boeing models. The data however was not included in the invention.
Rolls Boeing visit 6-03.ppt.
Rolls-Royce Services inventory management.htm Y:\Public Domain Prior Art\ROLLS ROYCE\Rolls-Royce Services inventory management.htm.
Rolls-Royce Services off wing.htm Y:\Public Domain Prior Art\ROLLS ROYCE\Rolls-Royce Services off wing.htm.
Rolls-Royce Services engine health.htm Y:\Public Domain Prior Art\ROLLS ROYCE\Rolls-Royce Services engine health.htm.
Rolls-Royce Services engine health.htm Y:\Public Domain Prior Art\ROLLS ROYCE\Rolls-Royce Services in service.htm.

CENTRAL SERVER FOR MANAGING MAINTENANCE AND MATERIALS FOR COMMERCIAL AIRCRAFT FLEETS WITH FLEET-WIDE BENCHMARKING DATA

CROSS-REFERENCE TO RELATED APPLICATIONS

This application is a continuation application of U.S. patent application Ser. No. 11/281,220 filed on Nov. 16, 2005; the entire disclosure of U.S. application Ser. No. 11/281,220 is hereby incorporated herein by reference.

FIELD OF THE INVENTION

This invention generally relates to maintenance of commercial vehicles, especially aircraft, and deals more particularly with centrally managed, integrated maintenance services for aircraft fleets.

BACKGROUND OF THE INVENTION

Maintenance of commercial aircraft fleets requires the coordination of multiple service and information providers, as well as part suppliers. Line and base maintenance operations required to support aircraft flight readiness require up-to-date service manuals, maintenance repair records, engineering drawings, trained personnel, specialized tools, facilities, parts and an array of other resources. The logistics required for deploying, warehousing and maintaining inventories of repair parts at multiple service locations is also complicated, since parts must be procured from multiple suppliers as well the OEM aircraft manufacturers. Supply chain management and coordination of service providers is made more challenging where fleet aircraft serve wide geographic areas, making centralized service and inventory control by the airline operators impractical.

While some minor maintenance, e.g. line maintenance, is performed by certain airline operators, most operators either perform their own extensive maintenance (typically performed at base maintenance facilities) or outsource their maintenance by contracting with MROs (maintenance, repair and overhaul organizations). The airline operators nevertheless remain largely responsible for managing the material supply chain, performing service operations, coordinating ground service equipment, and managing information flow, including compliance with regulatory and maintenance certification requirements such as Air Worthiness Directives (ADs). Consequently, multiple commercial airlines must dedicate identical resources for maintaining the internal infrastructure and personnel needed to manage the various service and material management activities outlined above.

SUMMARY OF THE INVENTION

Accordingly, there is a need in the art for centrally managed, integrated maintenance services for aircraft fleets, which overcomes the deficiencies of the prior art discussed above. The present invention is directed toward satisfying this need.

In accordance with one aspect of the invention, a method is provided for managing maintenance management of fleet aircraft for customers. The method comprises the steps of: collecting data from each of the aircraft in the fleet relating to the condition of the aircraft; organizing a plurality of maintenance service providers under the control of an integrator utilizing a central maintenance and engineering management server to provide maintenance service for the aircraft in the fleet; organizing a plurality of part suppliers under the control of the integrator to provide parts used in the maintenance service; and, using the collected data to establish the effectiveness of the maintenance service.

In accordance with another aspect of the invention, a method is provided for managing maintenance of commercial fleet aircraft for customers. The method comprises the steps of: organizing maintenance service providers under the control of an integrator utilizing a central maintenance and engineering management server to provide maintenance service for the aircraft in the fleet; organizing part suppliers under the control of the integrator to provide parts used in the maintenance service; collecting real-time data related to the operation of each of the aircraft; converting the collected data into information representing the reliability of each aircraft; establishing reliability benchmarks for the fleet using the reliability information; and, comparing the reliability of the aircraft in the fleet with the benchmarks.

In accordance with still another aspect of the invention, a method is provided for centrally managing the maintenance of fleet aircraft for customers utilizing a central maintenance and engineering management server. The method comprises the steps of: organizing a group of maintenance service providers and part suppliers under the control of an integrator utilizing a central maintenance and engineering management server to provide maintenance service and parts for the aircraft in the fleet; collecting real-time data from each of the aircraft related to the operation of the aircraft; generating reliability information representing the reliability of the aircraft based on the data collected; and, using the reliability information to establish benchmarks for the reliability of the fleet.

One advantage of the invention is that the overall cost of fleet aircraft service are reduced because maintenance services are integrated under the management of a single integrator utilizing a central maintenance and engineering management server, thus eliminating or reducing the need for each airline operator or owner to maintain the personnel and infrastructure normally required to manage maintenance and maintenance service providers. Another advantage of the invention resides in real time information sharing between the customer, maintenance service providers and the integrator. Real-time aircraft health data and maintenance information provided to the maintenance service providers through a web-based navigation tool improves their efficiency in planning and executing maintenance tasks.

Various additional objects, features and advantages of the present invention can be more fully appreciated with reference to the detailed description and accompanying drawings that follow.

DETAILED DESCRIPTION OF THE PREFERRED EMBODIMENTS

Figure 1:
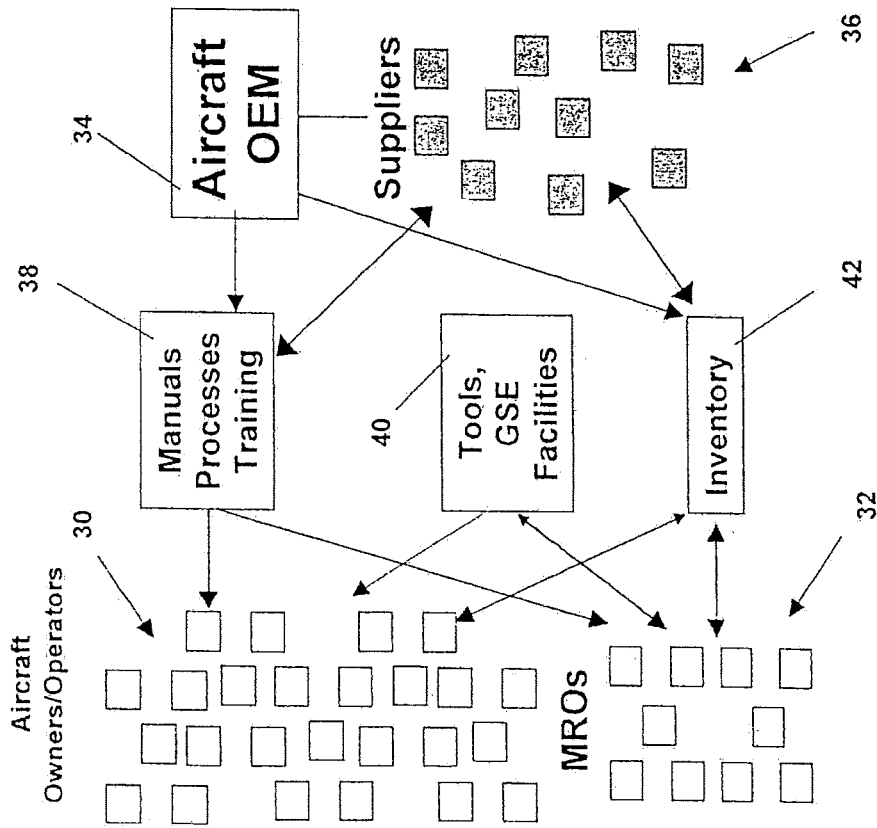
FIG. 1 is a block diagram showing the prior art system for managing maintenance and materials for a fleet of aircraft.

FIG. 1 shows the prior art arrangement for managing maintenance and materials for a fleet of aircraft. Aircraft in a fleet controlled by owners or operators 30 receive maintenance and repair parts from various sources, primarily under the management and control of the airline operators 30. The airline operators 30 perform their own maintenance or contract with maintenance, repair and overhaul organizations (MROs) 32 who provide major maintenance services at so-called base maintenance locations, however in some cases the MROs 32 may also provide minor maintenance services at so-called line maintenance locations or facilities. The aircraft OEMs (Original Equipment Manufacturers) 34 provide OEM parts to airlines and the MROs 32 which are maintained in the MRO's inventory 42.

The MROs 32 also maintain an inventory 42 of parts which they procure directly from part suppliers 36. Tooling, ground support equipment (GSE) and facilities 40 are procured by both the airline operators 30 and the MROs 32. Similarly, technical manuals and training 38 are obtained by both the airline operators 30 and MROs 32 from the aircraft OEM 34 and the suppliers 36. Thus, it may be appreciated that the current system for providing maintenance services and related materials to the airline operators 30 is highly decentralized, relies on complex logistics and requires each airline operator to maintain infrastructure and dedicated personnel to manage both internal and external maintenance services and the material supply chain.

Figure 2:
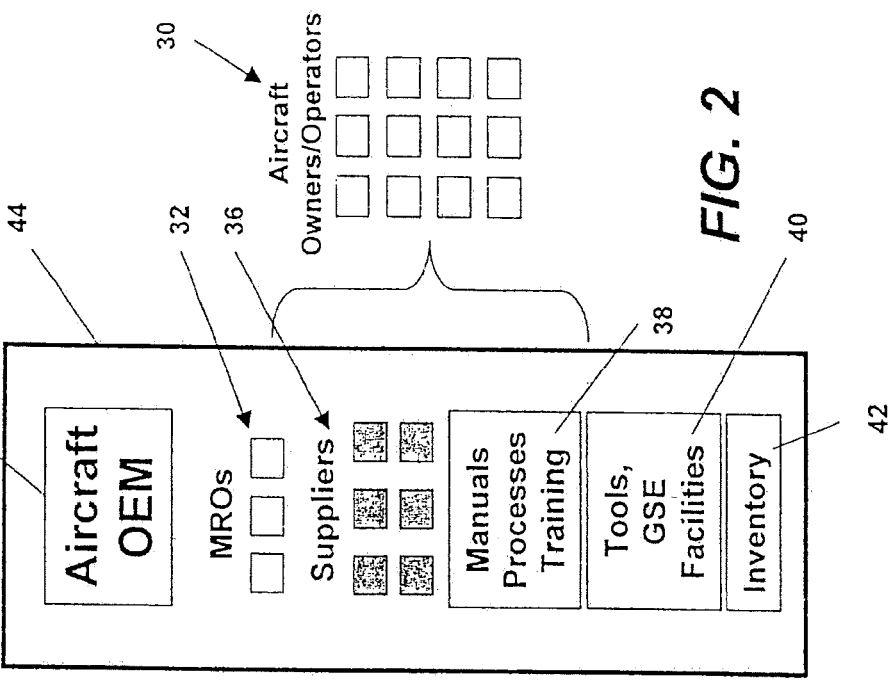
FIG. 2 is a block diagram showing the organization of an integrated maintenance and materials management system.

Reference is now made to FIG. 2 which shows how maintenance service and material providers are realigned in a centrally managed, integrated maintenance and materials service (IMMS) system 44. The IMMS 44 is managed by a single management service provider (MSP), sometimes also referred to herein as an integrator, which may be, for example, the aircraft OEM 34. As will be discussed later in more detail, the MSP has responsibility for managing the MROs 32 and suppliers 36, as well as managing the necessary manuals, training 38, tooling, GSE and facilities 40 and parts inventory 42. The MSP provides the IMMS to each of the airline operators 30 by utilizing a central maintenance and engineering management server, essentially as a turnkey service, relieving the airline operators 30 of the need for managing MROs, parts inventory, etc. Optionally, the MSP may provide the airline operators 30 with only centrally managed maintenance, or centrally managed, integrated materials management (IMM).

Figure 3:
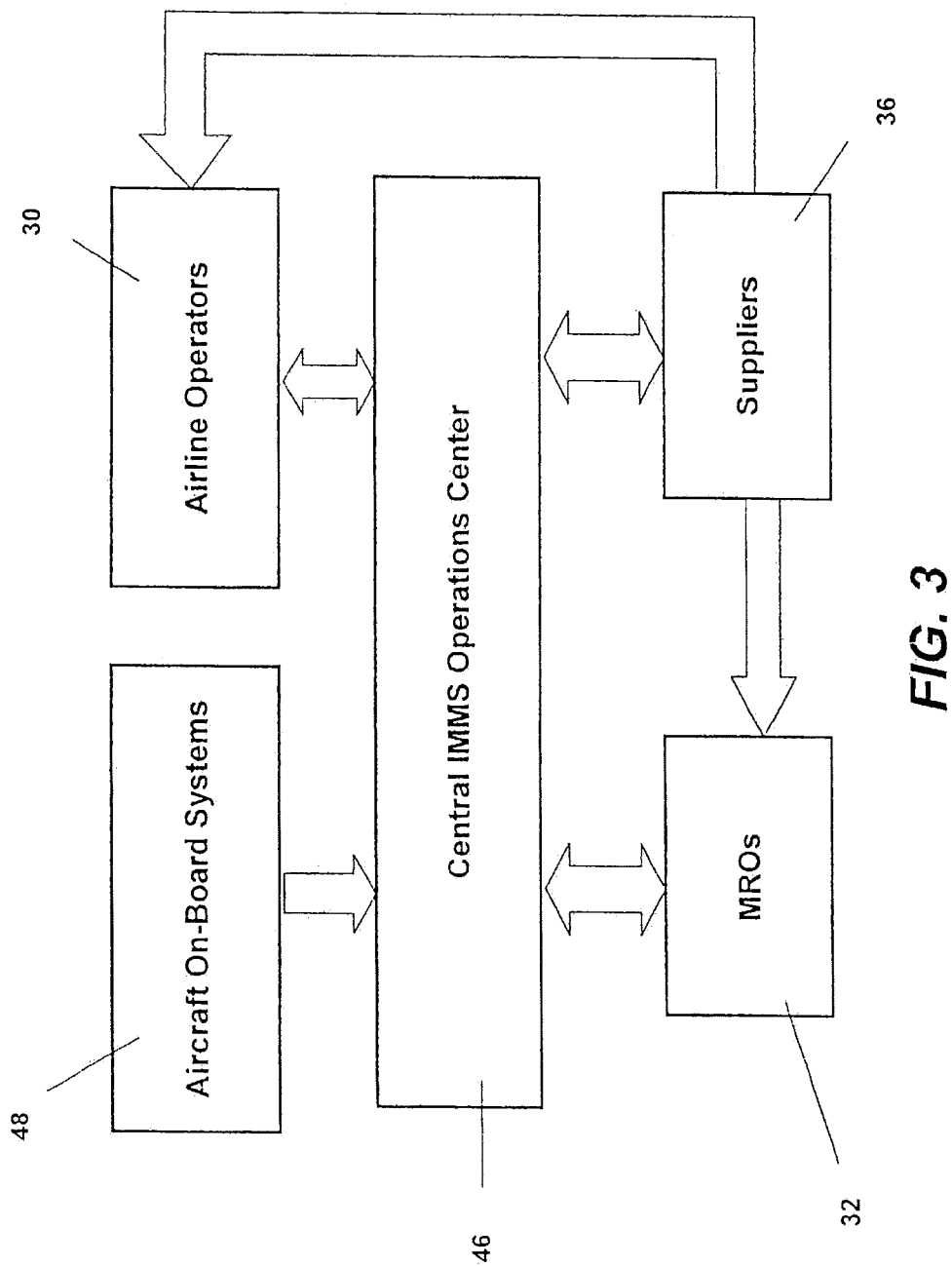
FIG. 3 is a block diagram showing the primary functional elements of the system shown in FIG. 2.

FIG. 3 shows the overall functional relationship between the MROs, parts suppliers, customers and central management of maintenance functions provided by the MSP. The MSP controls a central IMMS operations center 46. The operations center 46 receives at the central maintenance and engineering management server various kinds of data from aircraft onboard systems 48, and converts this data into centrally stored information which is used in the management of the IMMS. As will be discussed later in more detail, this onboard systems data may include for example, flight log records, data from a flight record recorder, aircraft health management and aircraft configuration information. Information is exchanged between the operations center 46 and the airline customers 30. For example, information is obtained from the airline operators 30 relating to performance of the aircraft, departure and arrival information, reliability data, etc. The information from the on-board systems 48 and the airline operators 30 is used for a variety of purposes at the operation center 46, including scheduling and ordering of parts, scheduling and ordering of maintenance operations and determining aircraft utilization that is converted into the price charged to the airline operators 30 for the services rendered by the MSP.

Information is exchanged between the MROs 32 and the operation center 46 which facilitates scheduling and coordination of base and/or line maintenance for the customer's aircraft. Finally, information is exchanged between the operation center 46 and the part suppliers 36 who are managed directly under the IMMS system by the MSP.

Figure 4:
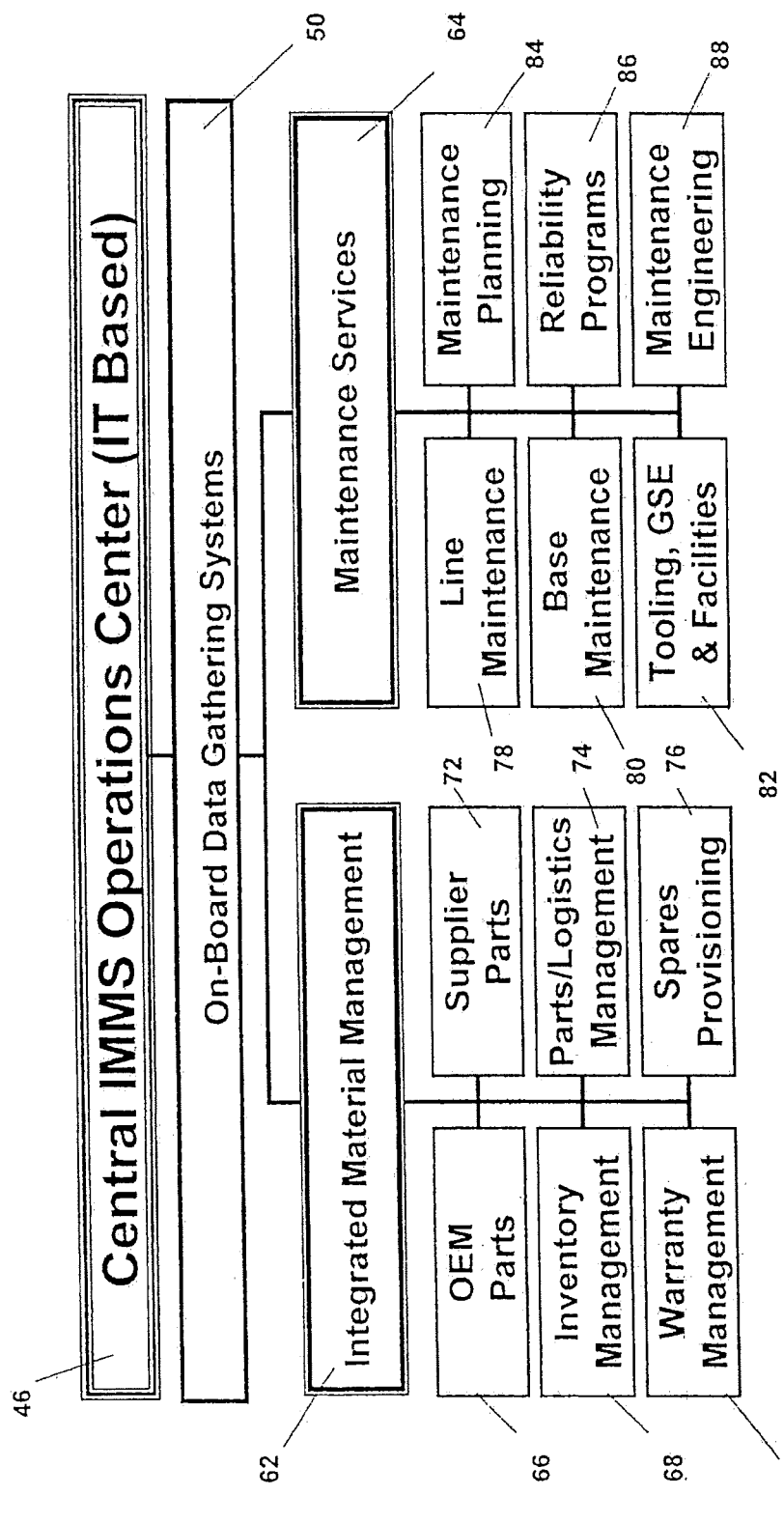
FIG. 4 is a block diagram showing the functional elements of the integrated materials management and the maintenance services in relation to a central operations center.

Referring now to FIG. 4, integrated material management 62 and maintenance services 64 are controlled and managed by the central operations center 46 by utilizing a central maintenance and engineering management server and using information about the aircraft obtained from on-board data gathering systems which will be discussed later in more detail. The central operations center 46 may provide an airline operator customer with either maintenance services 64 or the IMM service 62, or both. As used herein, integrated maintenance and material services or IMMS means a service program provided to a customer that combines and integrates both maintenance services 64 and the IMM 62.

As will be discussed later in more detail, IMM 62 includes management by the MSP of OEM parts 66, supplier parts 72, parts inventory management 68, management of parts/logistics 74, warranty management 70 and spare part provisioning 76.

The maintenance services 64 include line maintenance 78, base maintenance 80, management of tooling, ground support equipment and facilities 82, maintenance planning 84, management of reliability programs 86, and maintenance engineering 88.

In the case where the MSP provides the airline operator customer 30 with only IMM as a standard service, the MSP assumes responsibility for procuring the parts, which the MSP then deploys to the airline operator 30 or to the MROs 32. The aircraft OEM 34 retains ownership (legal title) of the parts, but the customer 30 takes responsibility for warehousing the parts inventory. As will be later discussed, a server is maintained onsite at the parts warehouse which is networked with the operations center 46.

When the customer 30 removes a part from the warehouse for use in servicing an aircraft, the removal of the part from inventory is electronically communicated through the onsite warehouse server to the operation center 46, thus allowing the MSP to maintain real time records of the part inventory at the customer's warehouse. This real time information is used by the MSP to allow timely reordering of replacement parts, and just-in-time delivery to the customer's warehouse in order to maintain part inventories at optimum levels. When the operation center 46 receives notice at the central maintenance and engineering management server that the customer has removed a part from the warehouse inventory, ownership immediately passes to the customer 30 and the customer is invoiced for the part. This business model allows the MSP to accumulate historical information concerning the type and number of parts used by the customer 30 at multiple warehouse locations, which aids the MSP in efficiently managing part inventory levels and the logistics of part delivery. Moreover, this accumulated information concerning the parts used by the customer aids the MSP in providing data to pricing model used to charge the customer for the services provided by the MSP.

The IMM program described above allows the aircraft OEM 34 to purchase parts based on the customer's forecasted consumption. As a result, it is generally necessary to carry lower levels of inventory, and fewer parts are required to be written off to obsolescence. Moreover, the IMM parts management program facilitates balancing and pooling of part inventories at differing customer warehouse locations.

In contrast to the IMM program utilized as a stand alone service, the management and deployment of parts is handled in a different manner when the MSP provides the customer 30 with IMMS, as will be discussed below in more detail. Briefly, the customer is not required to warehouse most parts under the IMMS program since the parts sourced either from the OEM 34 or suppliers 36 are supplied directly to MROs 32 in connection with the maintenance provided by the MROs 32.

Figure 5:
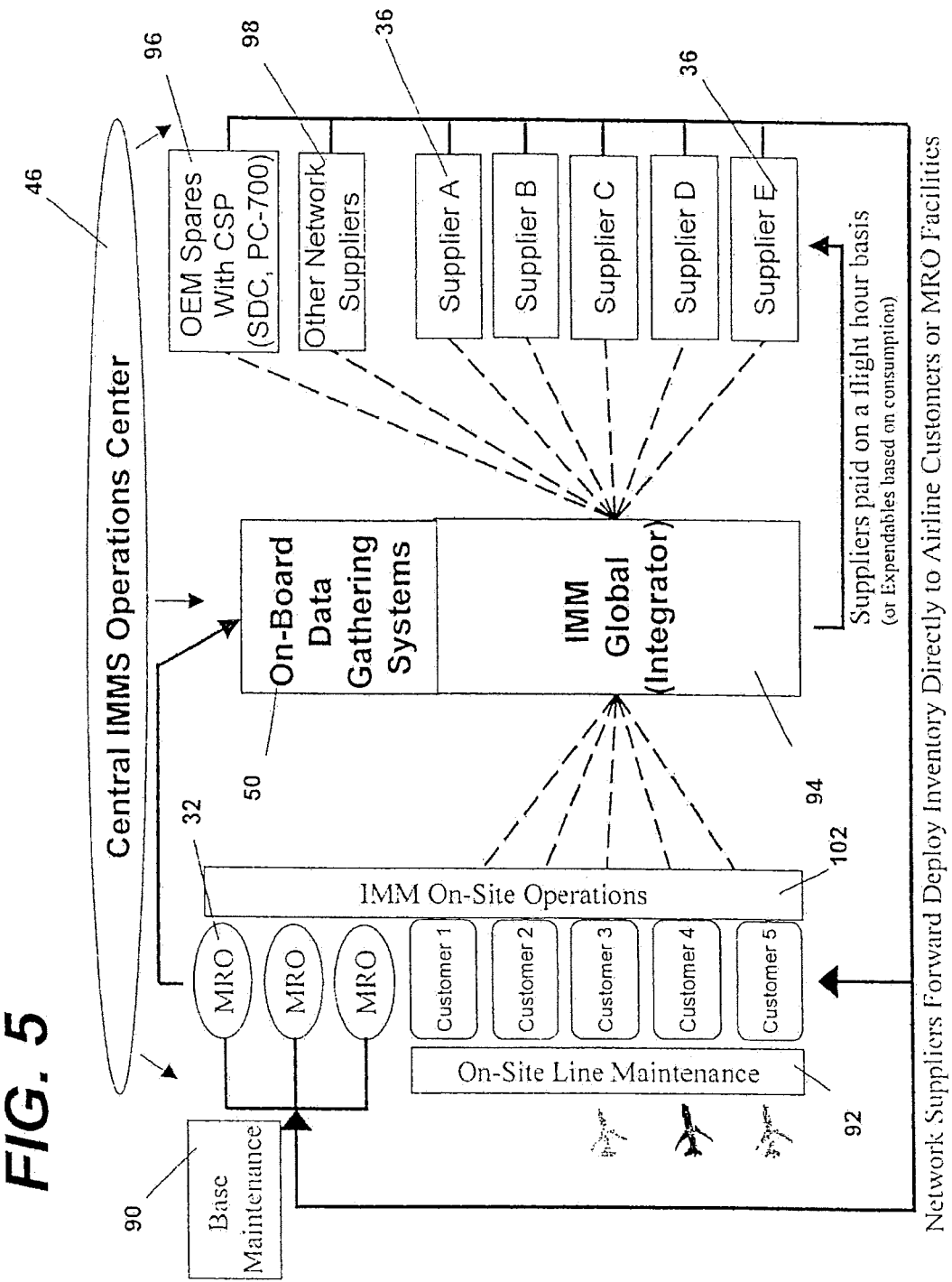
FIG. 5 is a block diagram showing the organizational relationship between the aircraft owners/operator, MROs, parts suppliers and the central operations center.

Attention is now directed to FIG. 5 which shows in greater detail how IMMS provided to customers is managed by the MSP using a central operations center 46 having a central maintenance and engineering management server. The MSP contracts with and manages MROs 32 who provide onsite line maintenance 92, generally at locations where the customers 30 fly. The MROs 32 also provide the customers with base maintenance, coordinated by the central operations center 46. In instances where unplanned maintenance is required, based on on-board systems, the operations center acts as a global integrator of the parts, engineering, services and maintenance tasks to perform the necessary work to remedy the fault. In IMMS, however, the operation center 46 manages the entire materials supply chain, ordering parts directly from the OEM 96, network suppliers 98 and various other suppliers 36, and arrange for their delivery to the MROs 32.

In one possible business model, the MSP pays the suppliers 36 based on aircraft flight hours, or where the parts involve expendables, the charges are based on consumption. The operations center 46 manages deployment of the parts either directly to the customers 30 (where maintenance service is not provided by the MSP), or to the MROs 32 (where IMMS is provided). In either event, the MSP provides up to 100% of the customers part requirements which are managed by the MSP until the exchanged part is installed on the aircraft. Under IMMS, the MSP provides a guaranteed level of service to the customers 30, and as can be appreciated from FIG. 5, the operations center 46 managed by the MSP utilizing a central maintenance and engineering management server acts as a single point of management and invoicing for the entire materials supply chain.

Figure 6:
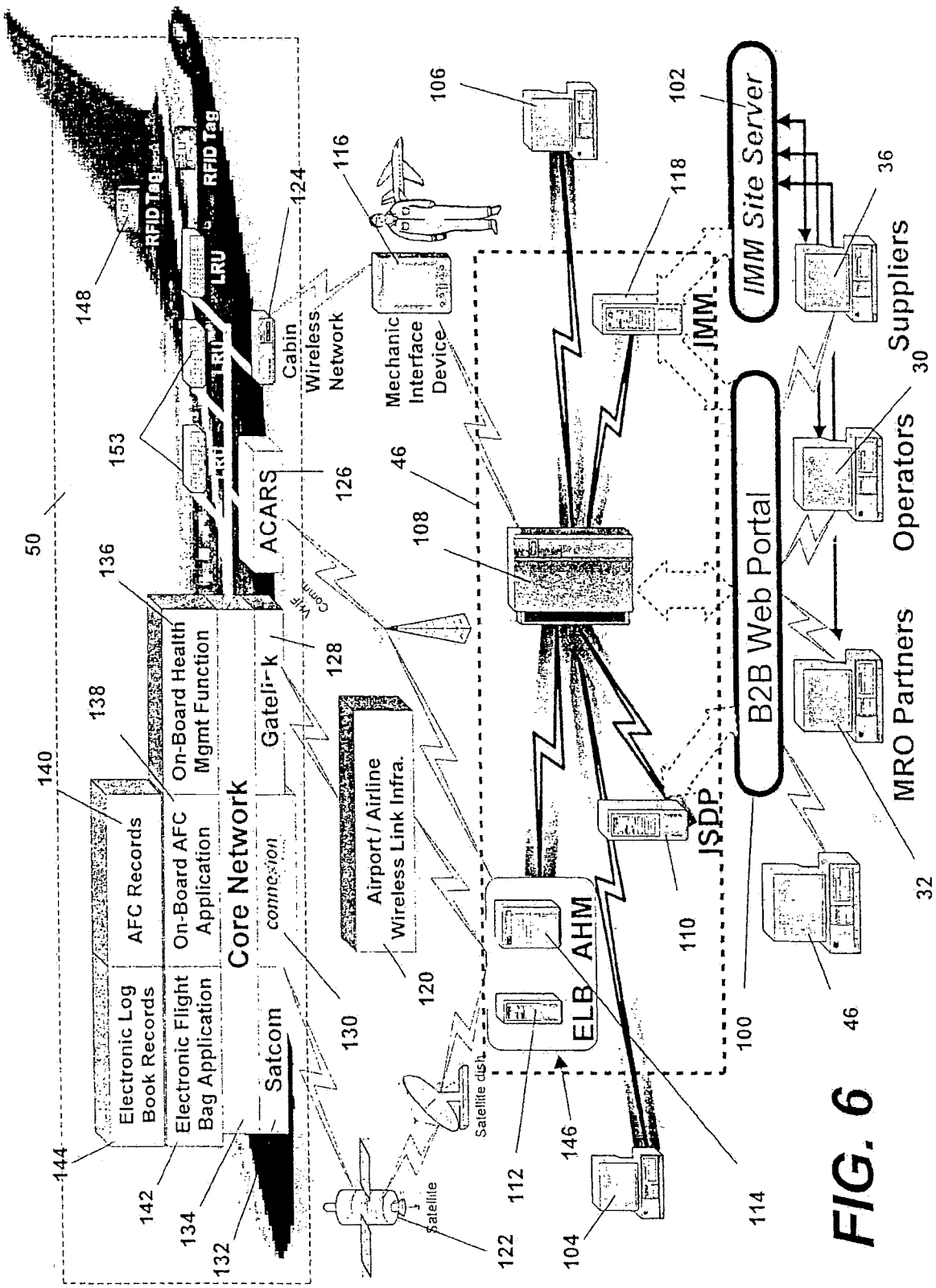
FIG. 6 is a combined block and diagrammatic view showing additional details of the integrated materials management and maintenance system, including aircraft onboard systems, and depicting the transformation of data into information, and the sharing of this information between the MSP, the suppliers and the MROs.

Reference is now made to FIG. 6 which shows details of the architecture of the IMMS program for aircraft fleets. Broadly, a number of onboard data gathering systems 48 gather and download aircraft data through, for example, wireless links, broadband, narrowband or other suitable communications systems to the operations center 46 where the data is converted to information that is stored and used to manage the IMMS program. It is also possible to download the data through hard communication connections when the aircraft is on the ground. In the preferred embodiment, MROs 32, airline operators 30 and suppliers 36 are connected to the operation center 46 through a suitable communication link, such as for example, an internet web portal 100.

The onboard data systems 50 include a variety of devices and record management systems interconnected through an onboard data bus 48. A core network of applications connected with bus 48 includes, for example electronic log book records 144, which is an electronic flight bag application 142, as flying configuration records 140, an onboard as flying configuration application 138 and an onboard health management function application 136. The electronic flight bag application 142 provides the aircraft pilot with electronic charts, aircraft performance calculations, electronic documents, fault finders and electronic check lists. The electronic log book record 144 includes information related to aircraft faults that have been recorded onboard, or entered manually by the crew or aircraft personnel. The as flying configuration application 138 and AFC records 140 provide information concerning the current configuration of the aircraft. The onboard health management function 136 comprises aircraft system monitoring functions that relay, in real time, the current status of the aircraft systems which can be used to make repairs after the aircraft lands. Line replaceable units (LRU) 153 as well as RFID tags 148 provide information concerning other onboard components used to determine the as-flying configuration of the aircraft.

U.S. patent application Ser. No. 11/173,806 filed 30 Jun. 2005 entitled "Integrated Device for Configuration Management", (Inventors Marc R. Matsen et al), shows how RFID tags may be used to track aircraft configuration is incorporated by reference for all purposes. U.S. Patent Application No. 60/718,884 entitled, "RFID Tags on Aircraft Parts", filed 20 Sep. 2005 by (Inventor: Michael C. Muma) and U.S. patent application Ser. No. 10/973,856 entitled: "Reducing Electromagnetic interference in Radio Frequency Identification Applications", filed 25 Oct. 2004 by (Inventor Kenneth D. Porad) also show use of RFID technology useful to implementing the present invention and are incorporated herein for all purposes.

The data provided by the onboard systems 50 is wirelessly communicated by any of a variety of communication links including a satellite 122 forming part of SATCOM 132, a proprietary wireless internet connection such as ConnexionSM 130 provided by the Boeing Company, wireless link 128 and associated terminal wireless infrastructure 120, aircraft communication addressing and reporting systems (ACARS) 126 as well as cabin wireless networks 124 which communicate to the operation center 46 through interface devices 116 typically used by aircraft mechanics. Systems suitable for use in wirelessly transmitting the data are disclosed in US Patent Application No. US 2005/0026609 A1 published Feb. 3, 2005, and US Patent Application Publication No. US 2003/0003872 A1, published Jan. 2, 2003, the entire contents of both of which are incorporated by reference herein.

Additional onboard systems suitable for use with the present invention are disclosed in copending applications: U.S. patent application Ser. No. 10/976,662 entitled: "Wireless Airport Maintenance Access Point" filed 27 Oct. 2004 to Allen and Mitchell; U.S. patent application Ser. No. 11/191,645 entitled "Airborne Electronic Logbook Instances and Ground Based Data System", filed 28 Jul. 2005 to Yukama et al., U.S. patent application Ser. No. 11/176,831, entitled "Distributed Data Load Management System Using Wireless Satellite or ACARS", filed 7 Jul. 2005 to David L. Allen et al.; U.S. patent application Ser. No. 11/199,399 entitled: "Methods for Fault Data Transfer from Airplane Central Maintenance Systems to Electronic Flight Bag Systems and Electronic Logbook (ELB) Application", filed 8 Aug. 2005 to Yukama et al each of which is incorporated by reference.

Wireless link 128 is a system that utilizes wireless local area network technology to transmit data throughout an airport environment enabling instant sharing of data between aircraft, passenger terminals, maintenance operations, etc. In one possible embodiment of the invention, onboard data is uploaded to a server site 146 which includes an ELB server 112 and an AHM server 114 that are in turn connected in a network with a central maintenance and engineering management (MEM) server 108 at the operations center 46. Also included at the operations center 46 is an in-service data program server (ISDP) 110 as well as an IMM server 118, both of which servers are connected by a network to the MEM server 108. A supplier management terminal 106 connected with server 108 allows communication with suppliers, while a finance business management terminal 104 connected with server 108 allows management of financial issues. The IMM server 118 is connected to the MROs 32 and operators 30 via the web portal 100, and is connected with the suppliers 36 via the onsite IMM site server 102.

Figure 7:
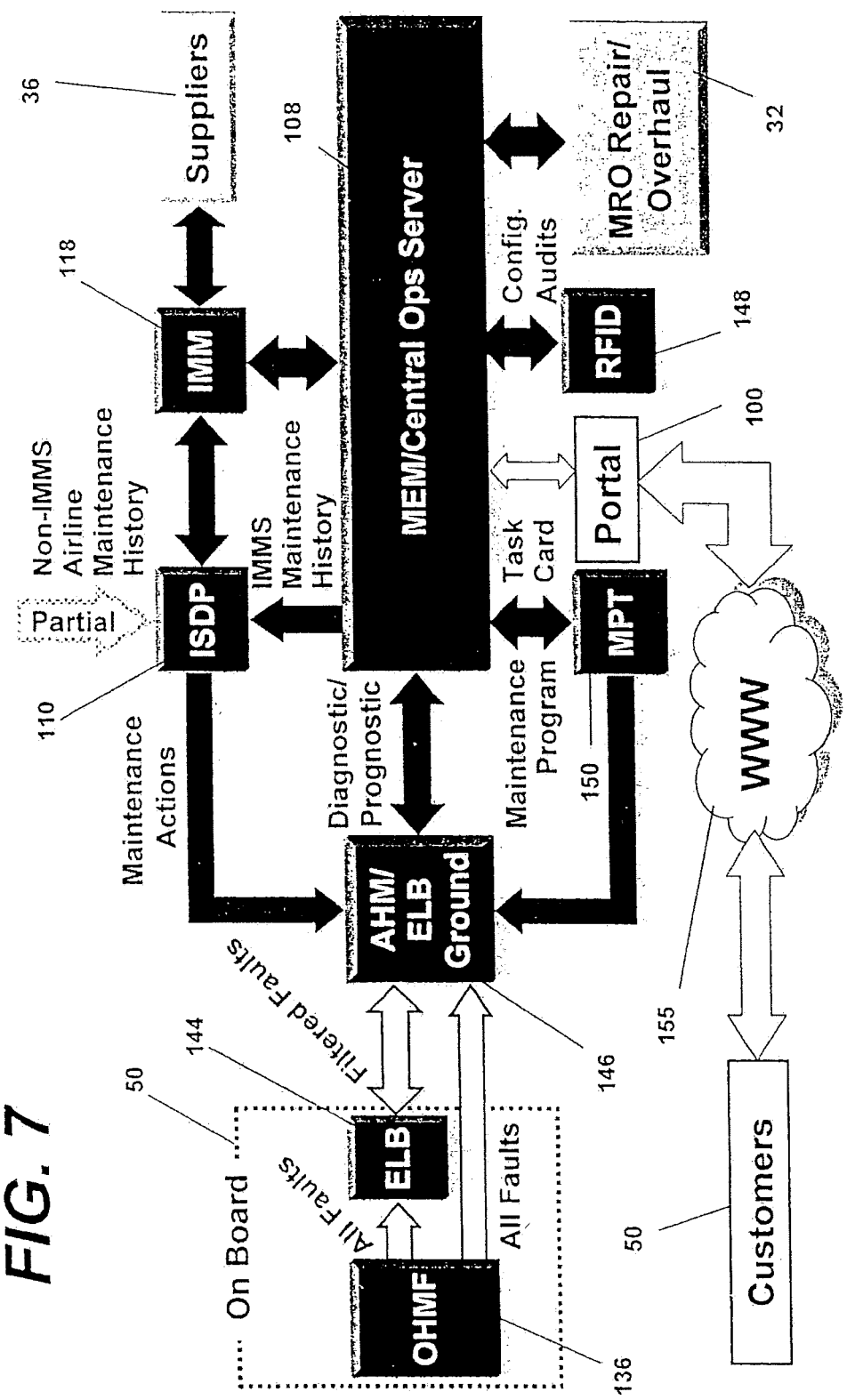
FIG. 7 is a block diagram showing the flow of data and information in the integrated materials management and maintenance system.

FIG. 7 shows, in block diagram form, the flow of information and data between the onboard systems 50, MEM server 108, the suppliers 36 and the MROs 32. In one possible embodiment, all faults registered by the OHMF 136 are logged in the ELB 144, filtered and delivered to a ground based server which collects these faults, as well as unfiltered faults directly from the OHMF 136. The ground based server site 146 communicates with the MEM server 108. Other techniques are possible for delivering the faults to the server 108. Both IMMS and non-IMMS airline maintenance history is provided to an in-service data program server (ISDP) 110 which also exchanges information with the IMM server 118.

A maintenance performance tool box (MPT) 150 exchanges information with server 108 and the server site 146. The MPT uses intelligent documents and visual navigation methods to assist technical operations staff to troubleshoot aircraft systems and manage structural repair records, parts and task cards. The MPT 150 provides 3D models for recording, reviewing and analyzing structural repairs, making use of accumulated repair knowledge and maintaining records of repair activities for one or more aircraft. The MPT 150 also acts as the repository for historical maintenance records for each aircraft which are required to be maintained by regulatory authorities. The central MEM 108 uses the data it receives to diagnose on board problems and form a prognosis for those problems. As can be more easily seen in FIG. 7, the customers 30 have access to an array of information and tools resident in the operations center 46 using the World Wide Web 100 to access the portal 100.

Figure 8:
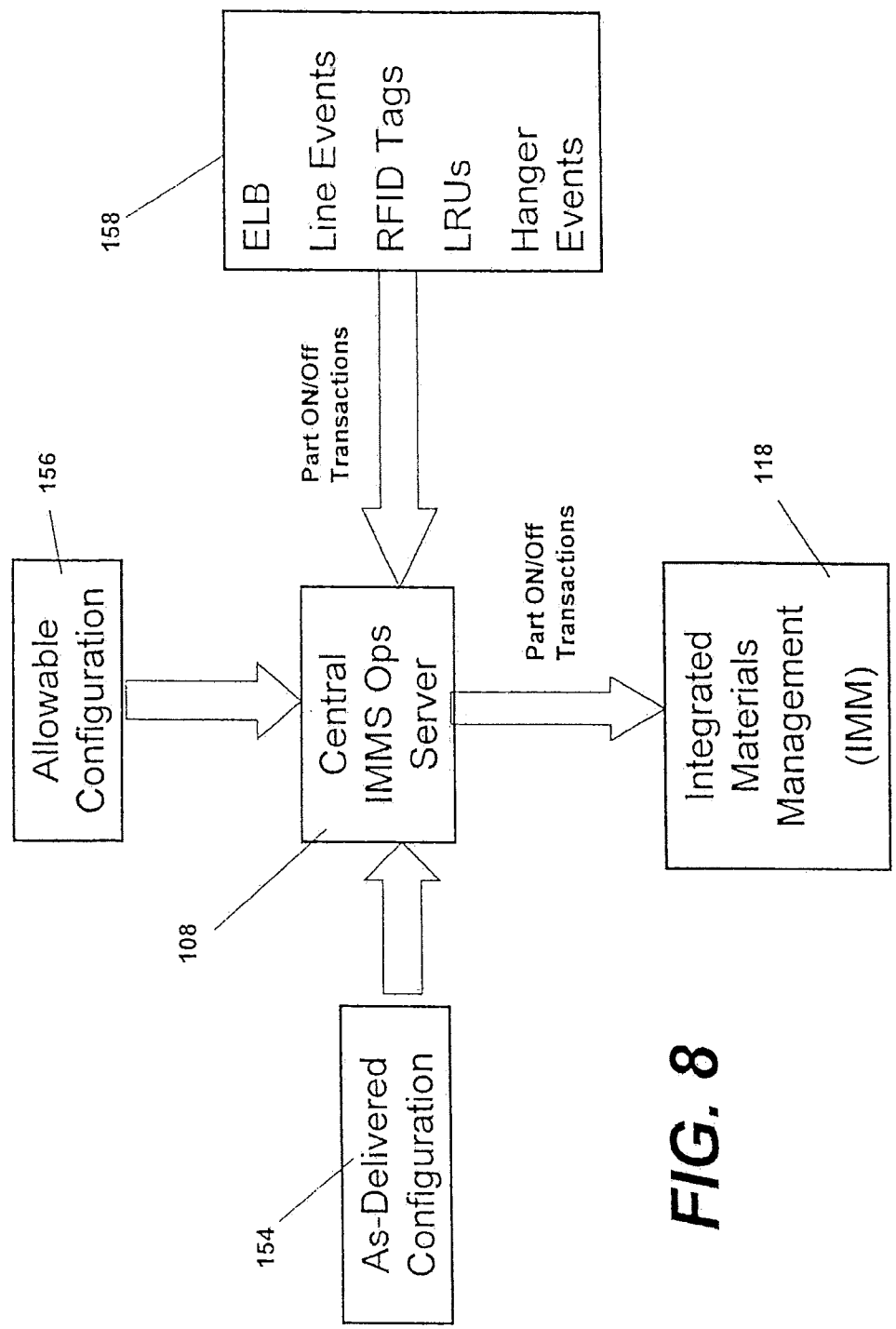
FIG. 8 is a block diagram showing how aircraft configuration data is gathered and used in the integrated materials management system.

One part of the IMMS system resides in the ability to determine the current configuration of aircraft, since parts and functional units are added, replaced or deleted on a routine basis. As shown in FIG. 8, the MEM server 108 maintains a record of the current as-flying configuration which is used to manage both maintenance and materials for the aircraft. The as-delivered configuration data 154 is provided to the server 108 which defines the configuration of the aircraft as initially delivered to the customer. Information concerning the allowable configuration 156 of the aircraft is also stored in server 108. Part on/off transactions derived from a variety of information sources 158 are provided to the server 108 and these transactions as well as the as-flying configuration are delivered to the IMM server 118 to be used in the management of materials. The part on/off transactions are recorded by devices such as the electronic log book, line events, RFID tags, LRUs, and hangar events, as shown at 158.

Figure 9:
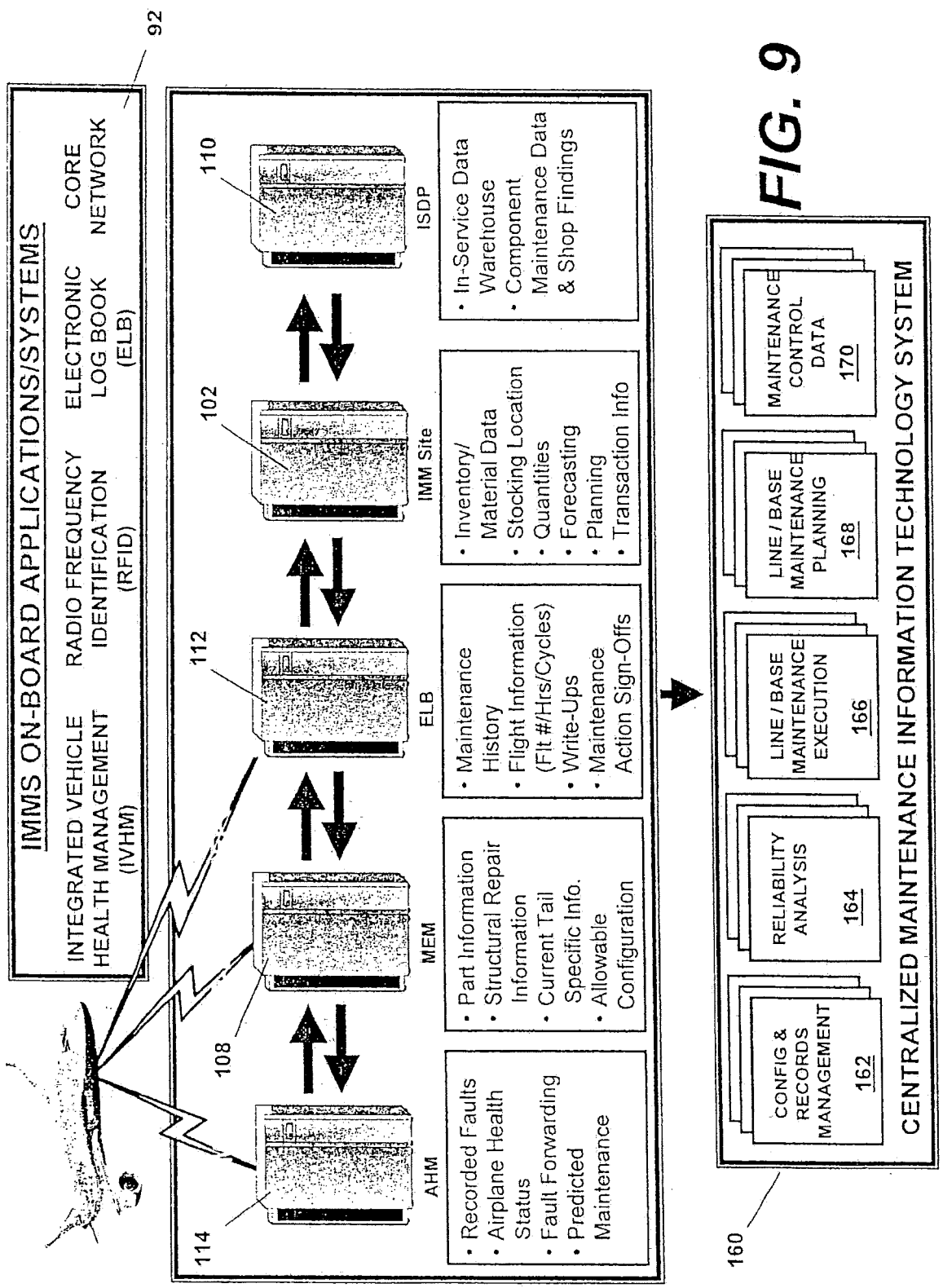
FIG. 9 is a combined block and diagrammatic view showing how on-board aircraft data is gathered and stored as centralized information.

Attention is now directed to FIG. 9 which shows in more detail the organization of information stored at the operations center 46 based on data derived from on-board applications and systems 48. The AHM server 114 stores recorded faults, airplane health status, fault forwarding information and predicted maintenance information, while the ELB server 112 stores maintenance history, flight information in terms of the flight number hours and cycles of the aircraft, write-ups by the pilots and maintenance action sign offs.

The MEM server 108 stores part information, information concerning structural repairs, current detailed specific information and allowable configuration information relating to the aircraft. The IMM site server 102 stores inventory and material data, stocking location information, part quantity information, forecasting information, planning information and transaction information. Finally, the ISDP server 110 stores in-service data warehouse information and component maintenance data as well as shop findings. Servers 102, 108, 110, 112, and 114 are connected in a common network or through the Internet so that all of the stored data can be transmitted and shared in real time by the servers and used by the MSP to manage the IMMS system. Other forms of information storage devices and communications links between them are also possible.

The information collectively stored in servers 102, 108, 110, 112, and 114 is organized to form a centralized maintenance information technology system 160, although these servers need not be in the same physical location. Electronic storage devices other than servers may be utilized. This information is arranged to facilitate management of various functions required by the IMMS system, including configuration and records management 162, reliability analysis 164, line/base maintenance execution 166, line/base maintenance planning 168 and maintenance control data 170.

Figure 10:
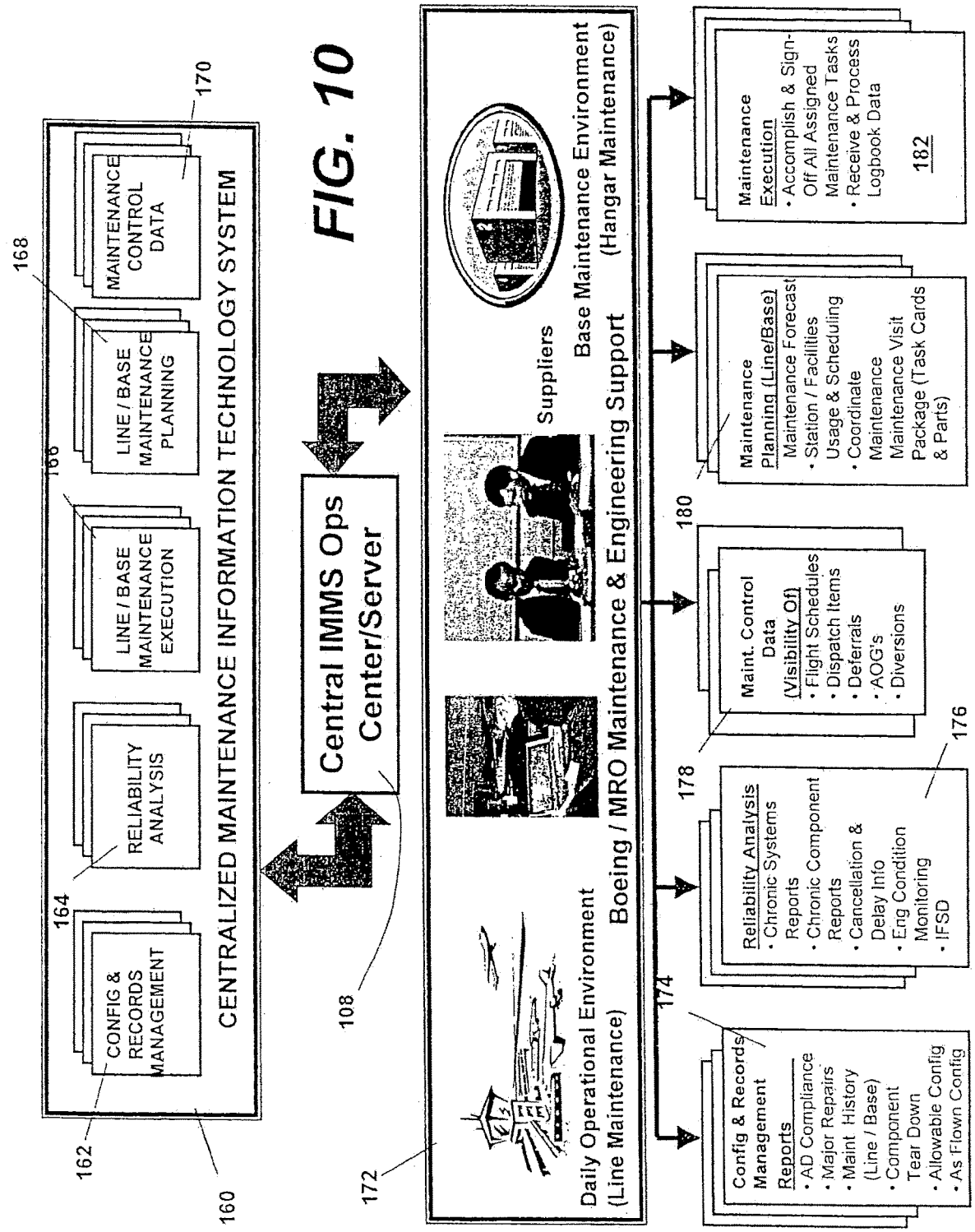
FIG. 10 is a combined block and diagrammatic view showing how the stored, centralized information is used to provide integrated maintenance and materials services.

As shown in FIG. 10, the information system 160 is used by the operations center 46 and central MEM server 108 to manage IMMS functions shown at 172, including line maintenance, MRO maintenance and engineering support and base maintenance. The configuration and records management information 162 is used to provide a variety of reports shown at 174 which may include AD (Air Worthiness Directive) compliance, major repairs, maintenance history, component tear down, allowable configurations and as flown configurations.

The reliability analysis information 164 is used to produce reports shown at 176, including chronic system reports, chronic component reports, cancellation and delay information, engine condition monitoring and IFSD (In Flight Shutdown). The line/base maintenance execution information 166 is utilized to produce maintenance control data shown at 178 which may include flight schedules, dispatch items, deferrals, AOG's (aircraft-on-ground) and diversions. The line/base maintenance planning information 166 is used to produce a variety of maintenance planning reports, including maintenance forecasts, station/facilities scheduling, coordination of maintenance, and maintenance visit packages (task cards and parts). The maintenance control data information 170 is used to execute maintenance as shown at 182 which includes accomplishment and sign off of all the signed maintenance tasks and receiving and processing log book data.

The information collected by the on-board systems 50 and transmitted to the operations center 46, as well as the related maintenance reports generated at the operations center 46, are provided to the MROs 32 who use this data and information to improve the quality of the maintenance they provide to the customers 30. For example, the MROs may use the information to improve the scheduling of maintenance facilities or ordering parts and materials. The MROs can also use the data to better predict the type of maintenance that may be required. The data can also be used to improve the technique for gathering the data. For example, the data may be used to develop new fault codes recorded by the ELB 144 which ultimately result in improved maintenance procedures. Similarly, the data transmitted to the operations center 46 from the on-board systems 50, and the related maintenance reports generated at the operations center 46, may also be fed back to the materials and part suppliers 36, who may advantageously use this information to improve the quality of the materials and parts they supply either to the customers or to the MROs 32, or to solve quality related problems. For example, the on-board data might be used by the suppliers to analyze why a part exhibits sensitivity to vibration.

Systems suitable for use in performing some of the functions discussed above are disclosed in U.S. patent application Ser. No. 10/360,295 entitled "Vehicle Monitoring and Reporting System and Method", by Basu et al, filed 7 Feb. 2003 and published 12 Aug. 2004 as US Patent No. 2004/0158367; and U.S. patent application Ser. No. 10/985,601 filed 10 Nov. 2004 entitled "System, Method and Computer Program Product for Fault Prediction in Vehicle Monitoring and Reporting System", by Maggione et al as well as U.S. patent application Ser. No. 10/884,553 filed 2 Jul. 2004 entitled: "Vehicle Health Management Systems and Methods as well as U.S. patent application Ser. No. 10/360,295 entitled "AHM Data Monitoring Business Process", filed 7 Feb. 2003 by Maggiore et al, each of which is incorporated herein by reference.

Figure 11:
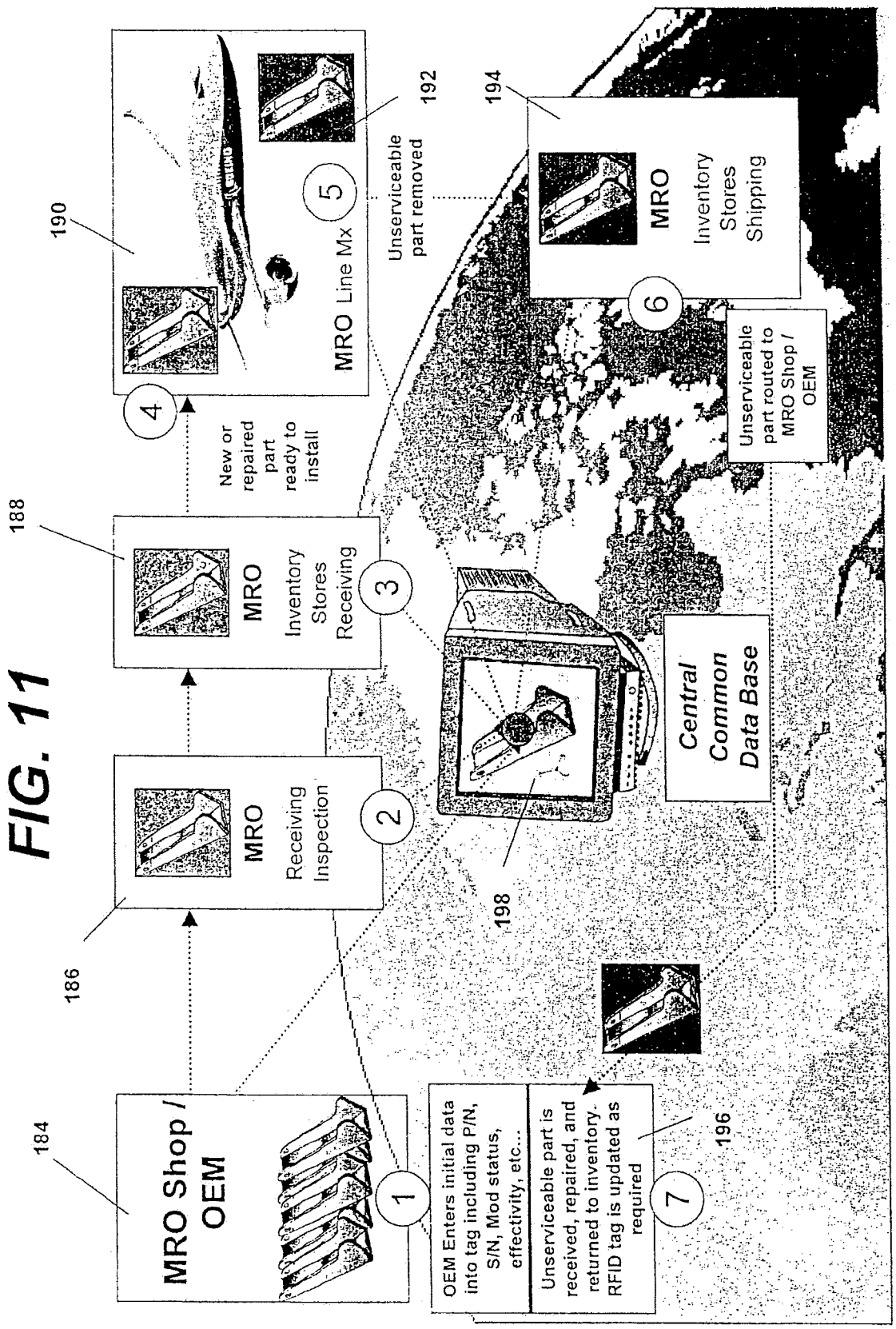
FIG. 11 is a diagrammatic view showing how the flow of parts is tracked in a centralized, common data base.

FIG. 11 shows the flow of a typical part in the IMMS system, and the use of RFID (radio frequency identification) tags to aid in tracking and identifying parts. At 184, the manufacturer of the part enters information into a central common database 198 which includes the part number, serial number, mod status, effectively, etc. This information is programmed into an RFID tag which is attached to the part. The part is shipped from the OEM to the appropriate MRO and received for inspection at 186. Upon receipt at receiving inspection, the RFID tag is read and the information is automatically recorded into the database 198 to register receipt of the part. When the part is received into inventory at 188, the RFID tag is again read and the status/location of the part is recorded in the database 198. Other forms of readable identification tags, labels or devices are possible.

When the part is removed from inventory and is ready to be installed at 190, the MRO records installation of the part at 192 and this entry is recorded in the database 198. Unserviceable parts are removed at 194 and returned to inventory stores, where they are routed either to an MRO shop or to the OEM for repair. As shown at 196, the unserviceable part is received, repaired and returned to inventory, and the associated RFID tag is updated as required. Also, when the part is removed from inventory, the as-flying configuration records are updated in the MEM server 108.

As previously described above, under the IMMS system, the airline operator customers purchase all line and base maintenance, all expendable and rotable parts management, and receive guarantees of minimum aircraft reliability and availability. The MROs perform all line and base maintenance, provide tooling and facilities and share performance guarantees and incentives with the IMMS service provider. The part suppliers own, distribute, repair and overhaul their parts, and also share guarantees and incentives with the MSP.

Figure 12:
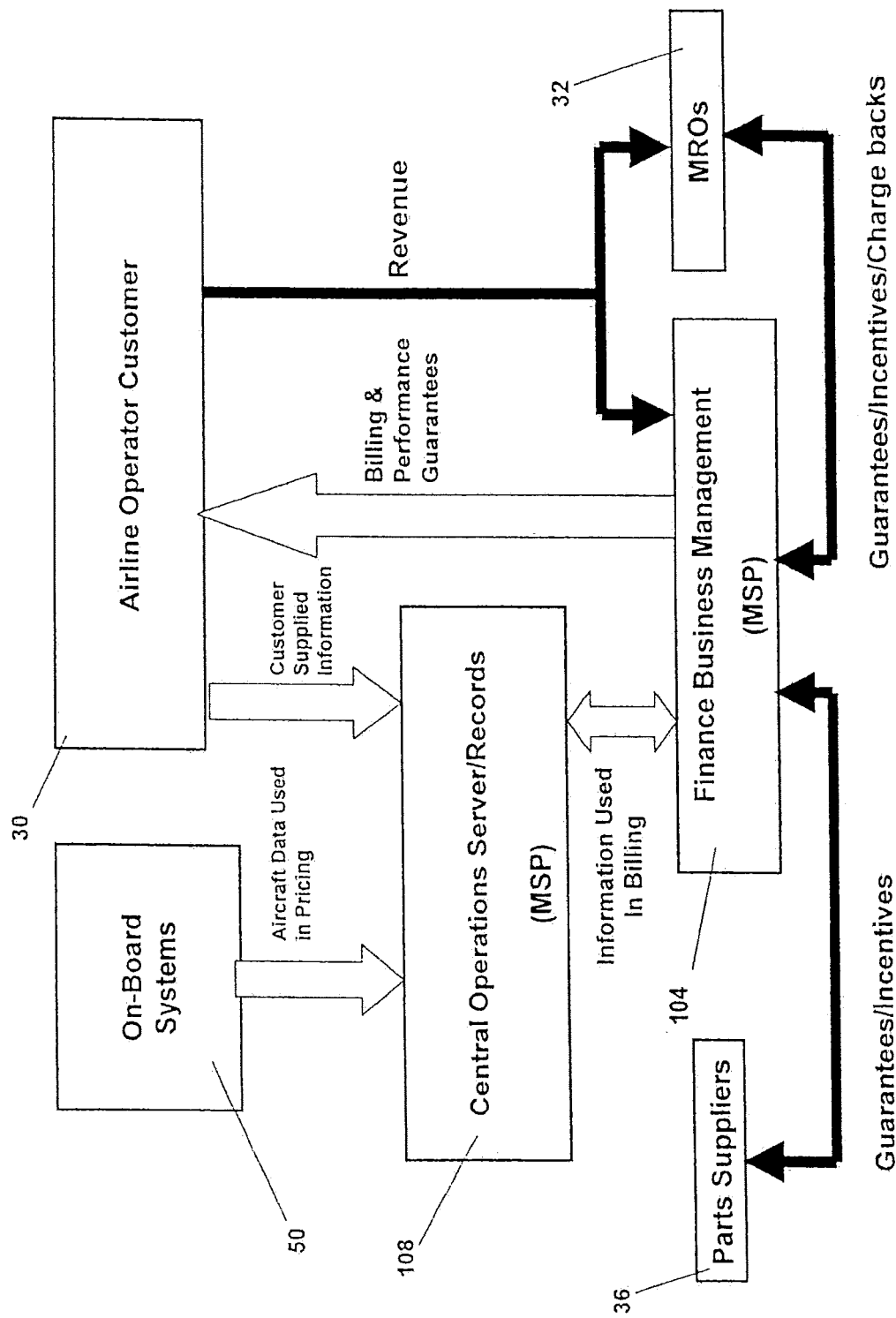
FIG. 12 is a block diagram showing how customer pricing is established for the integrated maintenance and material services.

Referring now to FIG. 12, the MSP may charge the customers 30 for the IMMS or IMM services provided based on a charge per flight hour using a variety of criteria to establish the price charge. For example, the price charge can be made to be dependent on the size of the customer's fleet that is receiving service, aircraft utilization (cycles and length of flight), the number of destinations for the aircraft over a service period, the operating environment of the aircraft, the number and location of line and base maintenance stations, and other factors. Either flat or graduated rates, or both, may be used. The charge rate may be adjusted based on performance agreements between the service provider and the customer. For example, in the event that the reliability of an IMMS maintained aircraft falls below an agreed-on standard, or is not available for at least a minimum length of time during a service period, the charge rate may be adjusted by an agreed-on amount to compensate the airline operator for the time the aircraft is out of service.

Charges and performance guarantees may be reconciled and adjusted periodically, for example, monthly or quarterly. The MSP may charge the customer a minimum base fee if the total number of aircraft flight hours is less than an agreed-on minimum level. The exact method and criteria for establishing pricing will vary depending on the agreements between the MSP, MROs 32, part suppliers 36 and the customers 30. Generally however, the method for establishing pricing can be implemented using one or more software-based algorithms using common techniques well known by those skilled in the art.

Responsibility for guarantees given by the MSP to the customers may be shared with the MROs and the suppliers. For example, if the MSP fails to meet the guarantee criteria promised to the customer due to sub-performance by an MRO 32, that MRO's portion of the revenue from the customer can be adjusted downwardly. Similarly, if the MSP fails to meet the guarantee criteria due sub-performance by the parts supplier, the MSP may penalize the supplier.

Pricing to the customer may also be adjusted to reflect agreed-on performance incentives given to the MSP which it may share with the MROs 32 and part suppliers 36. For examples, the customer 30 and the MSP may agree on an incentive arrangement where the customer 32 pays more than the normal charge rate, e.g. 105% of the normal rate, where the MSP exceeds the guarantee criteria by more than an agreed-on amount.

The revenues generated by the IMMS system may be shared with the MROs 32, if desired, particularly for unscheduled line maintenance. The MROs' share of the revenue may be based on the number of departures, for example, and factored by the MRO's dispatch reliability performance. NFF (no fault found) charges due to improper trouble shooting can be charged back to the responsible MRO.

The calculations to determine reliability preferably distinguish between chargeable and non-chargeable events. Chargeable events are those caused by known or suspected malfunctions of the aircraft, its systems, components or processes/procedures used by the IMMS service provider, or the MRO. Preferably, only chargeable events are counted in calculating the reliability rate. Non-chargeable events are those events that are beyond the control of the IMMS service provider or the MRO.

Figure 13:
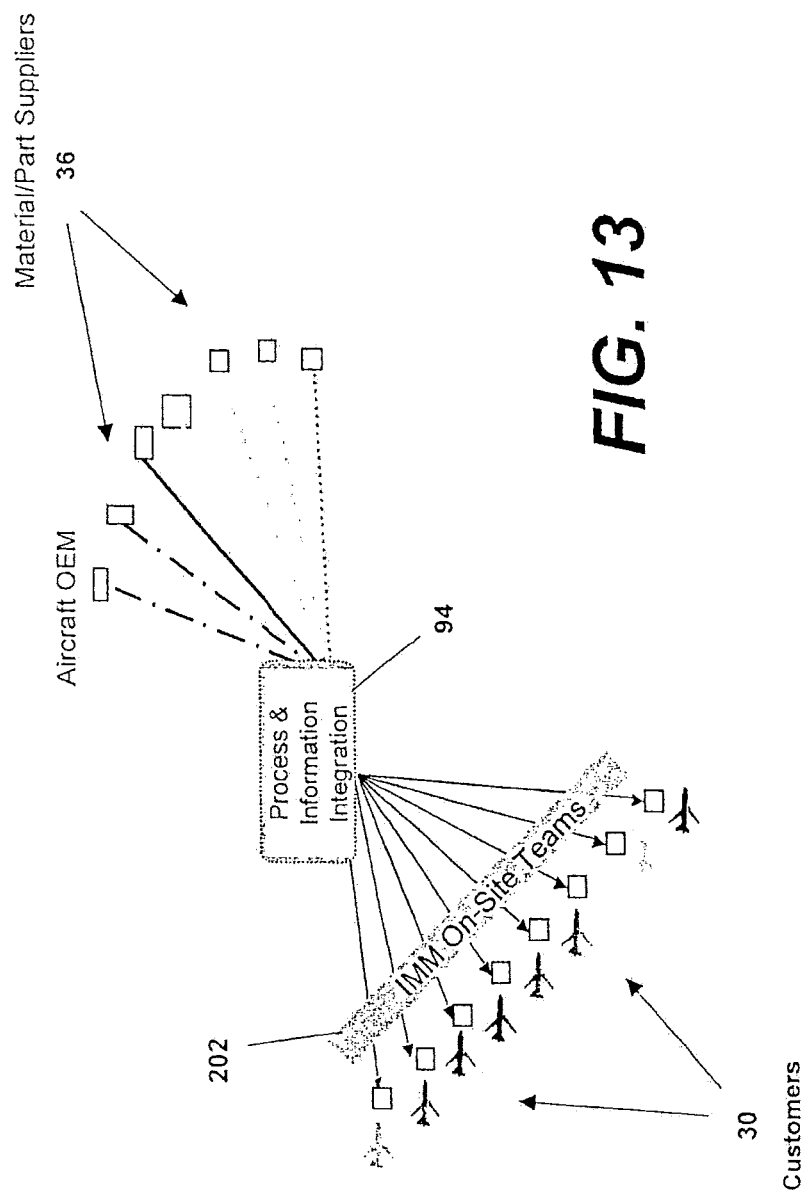
FIG. 13 is a diagrammatic view useful in understanding the integrated materials management system of the present invention, showing the relationship between material suppliers, the materials supply integrator and the customers.

Reference is now made concurrently to FIGS. 4, 5, 6, 7 and 13, which depict details of the IMM system. FIG. 13 shows the relationship between the airline operator customers 30, and an integrated network of parts and material suppliers 36 operating under the control of a parts network manager or integrator 94, which can be the MSP, previously described. As used herein, "parts" and "materials" may be used interchangeably, although it should be noted that the term "materials" generally refers to consumable items in the aviation industry. The integrator 94 may be, for example, an aircraft manufacturer 34 which is also one of the part suppliers 36, providing OEM parts to the customers 30, or to the MROs 32. Use of an aircraft OEM as the network integrator 94 takes advantage of the OEM's existing infrastructure and logistics management systems. As previously discussed, IMM provides a common infrastructure with suppliers, including an information architecture that permits the sharing of data between the integrator 94, suppliers 36 and customers 30.

The IMM system leverages the ability of a single management entity utilizing a central maintenance and engineering management server to effectively gather and disseminate data and information up and down the aviation services supply chain. By integrating and managing this supply chain using a single integrator 94, costs to the customer 30 can be significantly reduced, and part delivery performance can be improved. A significant opportunity is created for cost and delivery performance improvement to the suppliers 36 through improved part demand information from airline operations. Through aggregation and analysis, the suppliers 36 receive significantly better information than they would otherwise receive in a disaggregated supply chain. In effect, the IMM of the present invention provides the right parts and data, at the right place, at the right time, and at lower cost.

IMM effectively transitions responsibility for materials and part management from the customers 30 to the IMM integrator 94 utilizing a central maintenance and engineering management server. The IMM integrator 94 is responsible for maintaining information relating to the inventories and material data, stocking locations, quantities in each inventory, forecasting material requirement for each customer 30, planning and documenting material transactions. As previously described, the suppliers 36 retain ownership of the parts which the suppliers 36 deploy directly to customer specified warehouses, which may be located near the customers 30, or near MROs 32. The customers 30 are responsible for maintaining the warehouses and physically controlling the part inventories. Certain functions of the IMM are located on-site 202 (FIG. 13) at the customer's (or MRO's) location, including a local IMM site server 102 and related customer interface terminal (not shown) which are networked with the central MEM server 108 (FIG. 6). The local site server and customer terminal allow the customer 30 to plan inventories, interface with maintenance operations at the operations center 102 and interface with global operations and suppliers 36.

Central management of the aggregated supply chain by the IMM integrator 94 utilizing a central maintenance and engineering management server results in the integration of processes as well as information, allowing coordinated responses to customer requirements. Network inventory is optimized by the IMM integrator 94. Supply and demand information is shared in the supply chain network, and component information is captured and shared. The integration and management of the supply chain provides the IMM integrator 94 with sufficient control to enable it to provide certain guaranteed service levels to the customer 30. For example, the IMM integrator 94 may guarantee the customer 20 that quantities of parts will be maintained in inventory sufficient to meet the customer's service level requirements, with penalties to the IMM integrator 94 if the guaranteed service level is not met.

The scope of the materials included in the IMM system may extend to rotable, repairable and expendable parts and materials. A variety of plans for charging the customers 30 for parts may be followed. For example, rotable and repairable service can be charged on $/flight hour basis, where offered by the suppliers, to support line or base maintenance. The $/flight hour can be adjusted for aircraft utilization (range/cycles/hours), operating environment, or geography. The customer may be given the option to be charged a flat or a graduated rate. In the event that the suppliers do not offer rotable/repairables services on a $/flight hour basis, the IMM integrator 94 may provide these parts on a per-repair basis. Expendables can be charged on a per-transaction basis, i.e., as they are used by a customer 30. Support for incident repairs can be provided on a time and materials cost basis. In one business model, the IMM system excludes: engines (except engine buildup components), system and process functionality associated with warehouse management and receiving, performance of warehouse management and receiving, consumables (shop supplies), tools, and ground support equipment.

The ability of the customers 30 to plan and manage aircraft maintenance, and troubleshoot parts and materials issues is enhanced in the IMM system when the customer also utilizes the MPT 150 previously described with reference to FIG. 7. The MPT 150 is a navigational tool comprising an integrated suite of applications that increase productivity and performance of maintenance related tasks. Active links within 2D and 3D system diagrams and structural models take the customer directly to the information it needs to assist with maintenance issues, including parts and other materials. The MPT 150 is an integrated set of productivity tools that unifies maintenance activities with access provided to technical publications, training, maintenance, and engineering information. The customer's technical publications department may use the MPT 150 to create customized airline documents, modify original equipment manufacturer manuals, and create task cards.

The MPT 150 uses 3D airframe models and schematics of aircraft systems as "graphical" tables of content that enable point-and-click access to all of the information related to a specific aircraft location or component. Advanced data mining techniques and search capabilities are used by the MPT 150 to collect all relevant information (e.g. fault code lookup, repair history, maintenance procedures, part numbers, maintenance tasks) into the troubleshooting process. The MPT 150 automates the workflow required to review and approve documentation revisions and changes, while providing real-time editing tools that allow the customer to create and add their own documentation and notes.

The MPT 150 gives maintenance personnel such as mechanics, fast and efficient access to technical information. Embedded support tools facilitate various everyday tasks, including Service Bulletin evaluation. The MPT 150 provides a collaborative workspace and reuse of successful engineering solutions that reduce maintenance operations costs. The intuitive navigation techniques used by the MPT 150 help the user construct a mental image of the solution and takes the user directly to the applicable information. Real-time information updates ensure that the customer has access to the most current technical information. The MPT 150 is hosted at the operation center 46, and is available to the customers 30 globally, 24 hours a day.

The MPT 150 is useful in assisting the customers to manage parts and materials. The real-time aircraft data derived from the ELB 112, AHM 136 and stored as-flying configuration information can be used to determine possible part or system failures. This information can also be used to actively manage part tasks passed on to suppliers through MPT 150. The customers 30 can be charged a fee to use access and use the MPT 150 when participating in the IMM system, which may be the same as or different than the fee that the customers 30 would pay if they are not participating in IMM. Customer access to the MPT 150 can be included in the fees paid by the customer for IMM. For example, a fee for providing the customer with access to MPT 150 can be included in the $/flight hour charge to the customer for rotable and repairable service, in support of line or base maintenance. Alternatively, the fee for the MPT 150 can also be included in the flat charge or graduated rate for the IMM service.

The MPT 150 can also be advantageously used in combination with the IMMS previously described to further increase efficiencies, and reduce the cost of providing turn-key integrated maintenance and materials service to the customer. The MPT 150 is a valuable tool that allows the MRO or other service organization to actively manage the customer's maintenance programs. The cost of the MPT 150 can be priced into the rates charged by the MSP or integrator to the customer for the IMMS. The improved maintenance management efficiencies may act as an incentive for the customer subscribe for the HAMS plan. Additional details of the MPT 150 are disclosed in US Patent Application Publication No. US 2003/0187823 A1 published Oct. 2, 2003, and US Patent Application Publication No. US 2005/0177540 A1, published Aug. 11, 2005, the entire contents of both of which are incorporated by reference herein.

As previously described, the centralized maintenance information technology system 160 (FIGS. 9 and 10) allows a variety of reports to be generated that are useful in planning and executing maintenance tasks, and predicting future aircraft health. The reliability analysis data 164 and the related reliability reports 176 can be advantageously used to establish benchmarks for managing the IMMS and IMM programs previously described. For example, the data collected from the on-board systems 50 can be converted to reliability information that establishes the reliability of each aircraft utilizing a central maintenance and engineering management server. This information is based on data from the on-board systems 50 comprising the aircraft flight hours, utilization and health of the on-board systems, including recorded faults. The reliability information can be used to assess the effectiveness of the maintenance service and parts provided under IMMS or IMM, both for individual aircraft and for the fleet. Using the reliability information for the individual aircraft, benchmarks may be established for the entire fleet, and these benchmarks may then be used to determine to assess reliability over time.

The benchmarks for fleet reliability can be used to determine whether guarantees by the integrator to the customer of reliability or availability have been met. Similarly, the benchmarks can be used to determine whether fleet reliability has exceed certain incentive criteria which entitle the integrator to certain benefits promised by the customer. As previously discussed, the fees the integrator charges the customer for the maintenance service and the parts can be adjusted upwardly or downwardly from a base rate, depending on whether or not the benchmarks established for reliability or availability have been met or exceeded.

Although this invention has been described with respect to certain exemplary embodiments, it is to be understood that the specific embodiments are for purposes of illustration and not limitation, as other variations will occur to those of skill in the art. For example, while the preferred embodiment has been described in connection with its application to aircraft fleets, the invention can also be used with and successfully applied to other types of vehicles and vessels.

What is claimed is:

1. A computer-implemented method for managing maintenance and materials for an aircraft fleet comprising:

obtaining, by a central server over a wired communications connection, aircraft on-board systems data from on-board data systems of a plurality of aircraft after each aircraft of the aircraft fleet lands, wherein the aircraft on-board systems data comprises filtered fault data obtained from an onboard health management function (OHMF) application that are logged in an electronic flight bag and unfiltered fault data obtained directly from the OHMF;

obtaining, by the central server over a wireless communications network, information related to a performance of one or more aircraft from the plurality of aircraft from one or more airline operators;

converting the aircraft on-board systems data to a format usable by the central server for electronic storage;

storing, on a central database that is in electrical communication with the central server, the aircraft on-board systems data that are converted and the information related to the performance that is obtained;

storing, by a hardware processor of the central server, a predicted type of maintenance that may be required based on the aircraft on-board systems data;

providing, by the central server, a web portal over the wireless communications network to one or more parts suppliers to allow the one or more parts suppliers to access the central database to access data related to parts of one or more the aircraft to be maintained or replaced; and providing the web portal over the wireless communications network to one or more operators of the plurality of aircraft to allow the one or more operates to access a computer-implemented navigation tool that provides active links within a 2D, 3D, or both 2D and 3D system diagrams and structural models to assist with maintenance issues and the central database to access data related to a health of one or more of the aircraft based on aircraft on-board systems data and/or the information related to the performance.

2. The method for managing maintenance and materials for an aircraft fleet as recited in claim 1, further comprising:
obtaining, by the central server over the wireless communications network, airline operational data from a plurality of airline operator computing systems, and
providing, over the web portal, a plurality of maintenance requests and submitting a plurality of parts requests includes using the airline operational data.

3. The method for managing maintenance and materials for an aircraft fleet as recited in claim 2, further comprising:
obtaining, over the web portal, parts data from a plurality of part supplier computing systems and receiving and centrally storing the parts data at the central server;
obtaining, over the web portal, maintenance and repair data from a plurality of maintenance repair and overhaul computing systems and receiving and centrally storing the maintenance and repair data at the central server;
providing, over the web portal, integrated material management instructions to the plurality of part supplier computing systems, and
providing, over the web portal, maintenance services instructions to the plurality of maintenance repair and overhaul computing systems, with an integrated maintenance and materials service module of the central server.

4. The method for managing maintenance and materials for an aircraft fleet as recited in claim 3, where airline operational data from a plurality of airline operator computing systems includes one or more of aircraft performance data, departure data, arrival data, reliability data and failure data, and where the aircraft on-board systems data from on-board data systems of a plurality of aircraft includes one or more of electronic flight log data, electronic flight recorder data and aircraft configuration data.

5. The method for managing maintenance and materials for an aircraft fleet as recited in claim 4, wherein the reliability data is based on aircraft flight hours, utilization and health of the on-board data systems, and recorded faults.

6. The method for managing maintenance and materials for an aircraft fleet as recited in claim 1, wherein the data related to parts is provided by a radio frequency information tag.

7. The method for managing maintenance and materials for an aircraft fleet as recited in claim 6, wherein the radio frequency information tag comprises one or more of a part number, a serial number, or a mod status.

8. The method for managing maintenance and materials for an aircraft fleet as recited in claim 7, wherein the one or more of the part number, the serial number, or the mod status is stored in a central server memory.

9. The method for managing maintenance and materials for an aircraft fleet as recited in claim 1, further comprising generating a new fault code based on the aircraft on-board systems data.

10. The method for managing maintenance and materials for an aircraft fleet as recited in claim 1, further comprising generating a report based on the aircraft on-board systems data.

11. A computing system for managing maintenance and materials for an aircraft fleet comprising:
a network of computing devices having a central maintenance and engineering management server having a central server processor and a central server memory;
one or more programs, stored in the central server memory and executable by the central server processor, where the one or more programs include integrated maintenance and materials service (IMMS) program instructions for causing the central maintenance and engineering management server to perform various processes when executed where the instructions include,
instructions for executing with the central server processor computer executable central server instructions stored on the central server memory causing the central maintenance and engineering management server to perform a method comprising:
obtaining, by a central server over a wired communications connection, aircraft on-board systems data from on-board data systems of a plurality of aircraft after each aircraft of the aircraft fleet lands, wherein the aircraft on-board systems data comprises filtered fault data obtained and filtered from an onboard health management function (OHMF) application that are logged in an electronic flight bag and unfiltered fault data obtained directly from the OHMF;
obtaining, by the central server over a wireless communications network, information related to a performance of one or more aircraft from the plurality of aircraft from one or more airline operators;
converting the aircraft on-board systems data to a format usable by the central server for electronic storage;
storing, on a central database that is in electrical communication with the central server, the aircraft on-board systems data that are converted and the information related to the performance that is obtained;
storing, by a hardware processor of the central server, a predicted type of maintenance that may be required based on the aircraft on-board systems data;
providing, by the central server, a web portal over the wireless communications network to one or more parts suppliers to allow the one or more parts suppliers to access the central database to access data related to parts of one or more the aircraft to be maintained or replaced; and
providing the web portal over the wireless communications network to one or more operators of the plurality of aircraft to allow the one or more operates to access a computer-implemented navigation tool that provides active links within a 2D, 3D, or both 2D and 3D system diagrams and structural models to assist with maintenance issues and the central database to access data related to a health of one or more of the aircraft based on aircraft on-board systems data and/or the information related to the performance.

12. The computing system for managing maintenance and materials as recited in claim 11, wherein the method further comprises:
obtaining, over the web portal, airline operational data from a plurality of airline operator computing systems and receiving and centrally storing the operational data at the central maintenance and engineering management server, and
providing, over the web portal, a plurality of maintenance requests and submitting a plurality of parts requests includes using the airline operational data.

13. The computing system for managing maintenance and materials as recited in claim 12, wherein the method further comprises:
  obtaining, over the web portal, parts data from a plurality of part supplier computing systems and receiving and centrally storing the parts data at the central server;
  obtaining, over the web portal, maintenance and repair data from a plurality of maintenance repair and overhaul computing systems and receiving and centrally storing the maintenance and repair data at the central server;
  providing, over the web portal, integrated material management instructions to the plurality of part supplier computing systems, and
  providing, over the web portal, maintenance services instructions to the plurality of maintenance repair and overhaul computing systems, with an integrated maintenance and materials service module of the central server.

14. The computing system for managing maintenance and materials as recited in claim 13, where airline operational data from a plurality of airline operator computing systems includes one or more of aircraft performance data, departure data, arrival data, reliability data and failure data, and where the aircraft on-board systems data from on-board data systems of a plurality of aircraft includes one or more of electronic flight log data, electronic flight recorder data and aircraft configuration data.

15. The computing system for managing maintenance and materials as recited in claim 14, wherein the reliability data is based on aircraft flight hours, utilization and health of the on-board data systems, and recorded faults.

16. The computing system for managing maintenance and materials as recited in claim 11, wherein the data related to parts is provided by a radio frequency information tag.

17. The computing system for managing maintenance and materials as recited in claim 16, wherein the radio frequency information tag comprises one or more of a part number, a serial number, or a mod status.

18. The computing system for managing maintenance and materials as recited in claim 17, wherein the one or more of the part number, the serial number, or the mod status is stored in the central server memory.

19. The computing system for managing maintenance and materials as recited in claim 11, further comprising generating a new fault code based on the aircraft on-board systems data.

20. The computing system for managing maintenance and materials as recited in claim 11, further comprising generating a report based on the aircraft on-board systems data.

* * * * *